US007145969B1

(12) United States Patent
Hu et al.

(10) Patent No.: US 7,145,969 B1
(45) Date of Patent: Dec. 5, 2006

(54) METHOD AND APPARATUS FOR COMPLEMENTARY CODE KEYING

(75) Inventors: Guorong Hu, Sunnyvale, CA (US); Yungping Hsu, Cupertino, CA (US); Weishi Feng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 854 days.

(21) Appl. No.: 10/092,971

(22) Filed: Mar. 5, 2002

Related U.S. Application Data

(60) Provisional application No. 60/277,258, filed on Mar. 21, 2001.

(51) Int. Cl.
*H04D 1/00* (2006.01)
*H04B 7/216* (2006.01)

(52) U.S. Cl. .................. 375/343; 375/347; 375/348; 370/335; 455/522

(58) Field of Classification Search ................ 375/336, 375/340, 341, 343, 376, 342; 370/335, 252; 455/522
See application file for complete search history.

(56) References Cited

U.S. PATENT DOCUMENTS

| | | | |
|---|---|---|---|
| 5,615,230 A | 3/1997 | Gunther et al. | |
| 5,636,247 A | 6/1997 | Kamerman et al. | |
| 5,719,867 A * | 2/1998 | Borazjani | 370/436 |
| 5,841,813 A | 11/1998 | Van Nee | |
| 5,841,816 A * | 11/1998 | Dent et al. | 375/331 |
| 5,862,182 A | 1/1999 | Awater et al. | |
| 5,878,085 A | 3/1999 | McCallister et al. | |
| 5,966,055 A | 10/1999 | Knoedl, Jr. et al. | |
| 6,005,840 A | 12/1999 | Awater et al. | |
| 6,233,273 B1 * | 5/2001 | Webster et al. | 375/148 |
| 6,330,273 B1 | 12/2001 | Hulbert et al. | |
| 6,345,067 B1 | 2/2002 | Okamoto | |
| 6,345,073 B1 | 2/2002 | Curry et al. | |
| 6,347,112 B1 | 2/2002 | Lattard et al. | |
| 6,363,104 B1 | 3/2002 | Bottomley | |
| 6,697,350 B1 * | 2/2004 | Lomp | 370/342 |
| 2001/0034254 A1 * | 10/2001 | Ranta | 455/574 |
| 2003/0012267 A1 * | 1/2003 | Jitsukawa et al. | 375/148 |
| 2003/0067904 A1 * | 4/2003 | Nagatani et al. | 370/342 |

OTHER PUBLICATIONS

TA Wilkinson, AE Jones, "Minimization of the Peak to Mean Envelope Power Ratio of Multicarrier Transmission Schemes By Block Coding," VTC Chigago, Jul. 1995, 1995 IEEE.
Robert L. Frank, "Polyphase Complementary Codes," IEEE Transactions on Information Theory, vol. 26, Nov. 1980.
R. Sivaswamy, "Multiphase Complementary Codes," IEEE Transactions on Information Theory, vol. 24, No. 5, Sep. 1978.

(Continued)

*Primary Examiner*—Jean B. Corrielus
*Assistant Examiner*—Qutub Ghulamali

(57) ABSTRACT

An apparatus and a method for decoding data that has been Complementary Code Keying (CCK)-encoded at one of the set of first and second differing data rates. The method includes receiving a symbol, determining which of the first and second data rates was used to encode the symbol and applying the symbol to a first correlator to generate a set of correlator output signals. The first correlator generates the set of correlator output signals based on a first mode when the first data rate was used to encode the symbol and based on a second mode when the second data rate was used to encode the symbol. The method also includes identifying a maximum-valued signal in one of the set of correlator output signals and demodulating the maximum-valued signal in one of the set of correlator output signals.

65 Claims, 10 Drawing Sheets

OTHER PUBLICATIONS

Marcel J. E. Golay, "Complementary Series," IRE Transactions on Information Theory Apr.

Carl Andren, Mark Webster, "CCK Modulation Delivers 11Mbps for High Rate IEEE 802.11 Extension," Wireless Symposium/Portable by Design Conference Spring 1999.

IEEE Std 802.11b-1999, The Institute of Electrical and Electronics Engineers, Inc. New York, 2000.

Bob Pearson, "Complementary Code Keying Made Simple," Intersil, Application Note Nov. 2001 AN9850.2.

* cited by examiner

METHOD AND APPARATUS FOR COMPLEMENTARY CODE KEYING

CROSS-REFERENCE TO RELATED APPLICATION

Benefit of U.S. Provisional patent application Ser. No. 60/277,258, filed on Mar. 21, 2001, is hereby claimed, the contents of which are hereby incorporated by reference.

BACKGROUND

1. Technical Field

The invention relates generally to wireless local area networks, and more particularly, to wireless local area networks employing physical layer modulation and demodulation in accordance with IEEE802.11b.

2. Related Art

There are several known techniques for transmitting digital waveforms across wireless networks. One known technique is direct sequence spread spectrum (DSSS), which allows for high-rate modulation using complementary codes known as "spreading codes." The use of spreading codes enables the bandwidth occupied by a DSSS waveform to be increased or "spread." As a consequence of this bandwidth spreading (and despreading), DSSS systems are able to realize processing gains compared to systems using other transmission techniques.

Complementary Code Keying (CCK) is the modulation technique chosen for IEEE 802.11b high rate modes (5.5 Mbps mode and 11 Mbps mode). For example, a CCK modulated symbol c may be expressed as:

$$c = \{e^{j(\psi_1+\psi_2+\psi_3+\psi_4)}, e^{j(\psi_2+\psi_3+\psi_4)}, e^{j(\psi_1+\psi_2+\psi_4)}, -e^{j(\psi_1+\psi_4)}, \\ e^{j(\psi_1+\psi_2+\psi_3)}, e^{j(\psi_1+\psi_3)}, -e^{j(\psi_1+\psi_2)}, e^{j\psi_1}\} \quad (1)$$

where $v_1, v_2, v_3$ and $v_4$ are suitable phase values as described in more detail below.

where $\psi_1, \psi_2, \psi_3$ and $\psi_4$ are suitable phase values as described in more detail below.

For clarity of description, the chips in equation (1) are hereinafter referenced from left to right as c0–c7, respectively. In CCK modulation, the 4th and 7th chips, namely c3 and c6, are rotated 180° to optimize the correlation properties and reduce DC offset.

When operating in the 5.5 Mbps CCK mode (4 bits/symbol), the various phase values $\psi_1, \psi_2, \psi_3$ and $\psi_4$ employed in equation (1) are defined as shown below in equation (2).

$$\begin{cases} \varphi_1 = DQPSK \text{ encode with } (d0, d1) \text{ and even/odd} \\ \varphi_2 = (d2*2+1)*\pi/2 \\ \varphi_3 = 0 \\ \varphi_4 = d3*2*\pi/2 \end{cases} \quad (2)$$

where d0, d1, d2 and d3 are the 4 bits to be modulated.

When operating in the 11 Mbps CCK mode (8 bits/symbol), the various phase values are defined as shown below in equation (3).

$$\begin{cases} \varphi_1 = DQPSK \text{ encode with } (d0, d1) \text{ and even/odd} \\ \varphi_2 = (d2*2+d3)*\pi/2 \\ \varphi_3 = (d4*2+d5)*\pi/2 \\ \varphi_4 = (d6*2+d7)*\pi/2 \end{cases} \quad (3)$$

where d0, d1, . . . , d6 and d7 are the 8 bits to be modulated.

When demodulating, the d2–d3 bits (5.5 Mbps mode) or the d2–d7 bits (11 Mbps mode) will be decoded by the CCK correlator, and d0–d1 by DQPSK demodulation.

The published CCK 64-vector correlation can be written as:

$$R = C^T \begin{bmatrix} e^{j(\varphi_2+\varphi_3+\varphi_4)} \\ e^{j(\varphi_3+\varphi_4)} \\ e^{j(\varphi_2+\varphi_4)} \\ e^{j\varphi_4} \\ e^{j(\varphi_2+\varphi_3)} \\ e^{j\varphi_2} \\ e^{j\varphi_2} \\ 1 \end{bmatrix}^* =$$

$$C^T \begin{bmatrix} e^{j\varphi_2} & & & & \\ & 1 & & & \\ & & e^{j\varphi_2} & & \\ & & & 1 & \\ & & & & e^{j\varphi_2} \\ & & & & 1 \\ & & & & & e^{j\varphi_2} \\ & & & & & 1 \end{bmatrix}^* \begin{bmatrix} e^{j\varphi_3} & \\ & 1 \\ & & e^{j\varphi_3} \\ & & & 1 \end{bmatrix}^* \begin{bmatrix} e^{j\varphi_4} \\ 1 \end{bmatrix}^*$$

where $C^\tau = (c0, c1, c2, -c3, c4, c5, -c6, c7)$ (In-phase and Quadrature signal).

FIG. 1 depicts a CCK correlator architecture of the prior art. Only one phase or vector is shown for each of the $\psi$ values. It should be appreciated that the CCK correlator architecture depicted in FIG. 1 is capable of operating at either of 5.5 Mbps mode or 11 Mbps mode. As such, the actual hardware implementation and the time cost for both 5.5 Mbps and 11 Mbps modulation are the same, and therefore the power consumption is the same. In 5.5 Mbps modulation mode, $\psi_3$ is always equal to zero (see equation (2) above). Because the amount of real vector used for 5.5 Mbps modulation is less than the amount used for 11 Mbps modulation, the prior correlator wastes substantial power when operating at 5.5 Mbps and consumes as much power as is required for 11 Mbps operation.

SUMMARY

The present invention relates to a method and apparatus for a CCK correlator employing a reduced power consumption and achieves faster performance in the 5.5 Mbps mode of operation as compared with the 11 Mbps mode of operation.

An apparatus and method for decoding CCK-encoded data that has been encoded at one of first and second differing data rates is described. In one embodiment of the present invention, a CCK demodulator receives a symbol, determines based upon an indication contained with the data header whether the symbol was encoded at the first or second data rate, e.g. 5.5 Mbps or 11 Mbps, applies the symbol to a correlator to generate a set of correlator outputs based on the rate at which the symbol was encoded, identifies the maximum-valued correlator output signal, and demodulates the maximum-valued one of the correlator output signals to yield the CCK encoded data. The symbol preferably comprises eight complex chips. Further, the correlator comprises a phase rotator which rotates if the data was modulated at the higher data rate, e.g. 11 Mbps. Still further, the phase rotator is rotated through a predetermined number of phases, wherein the predetermined number is preferably four. The number of correlator output signals is dependent upon whether the data was encoded at the first or second data rate. After determining the maximum-valued correlator output signal, certain data bits are preferably decoded through the use of a look-up table. Some data bits are preferably decoded through the use of a DQPSK demodulator. The demodulator preferably determines if the data was encoded at the first or second data rate, e.g., 5.5 Mbps or 11 Mbps, based on information contained in the header of the encoded data.

DETAILED DESCRIPTION

Figure 1:
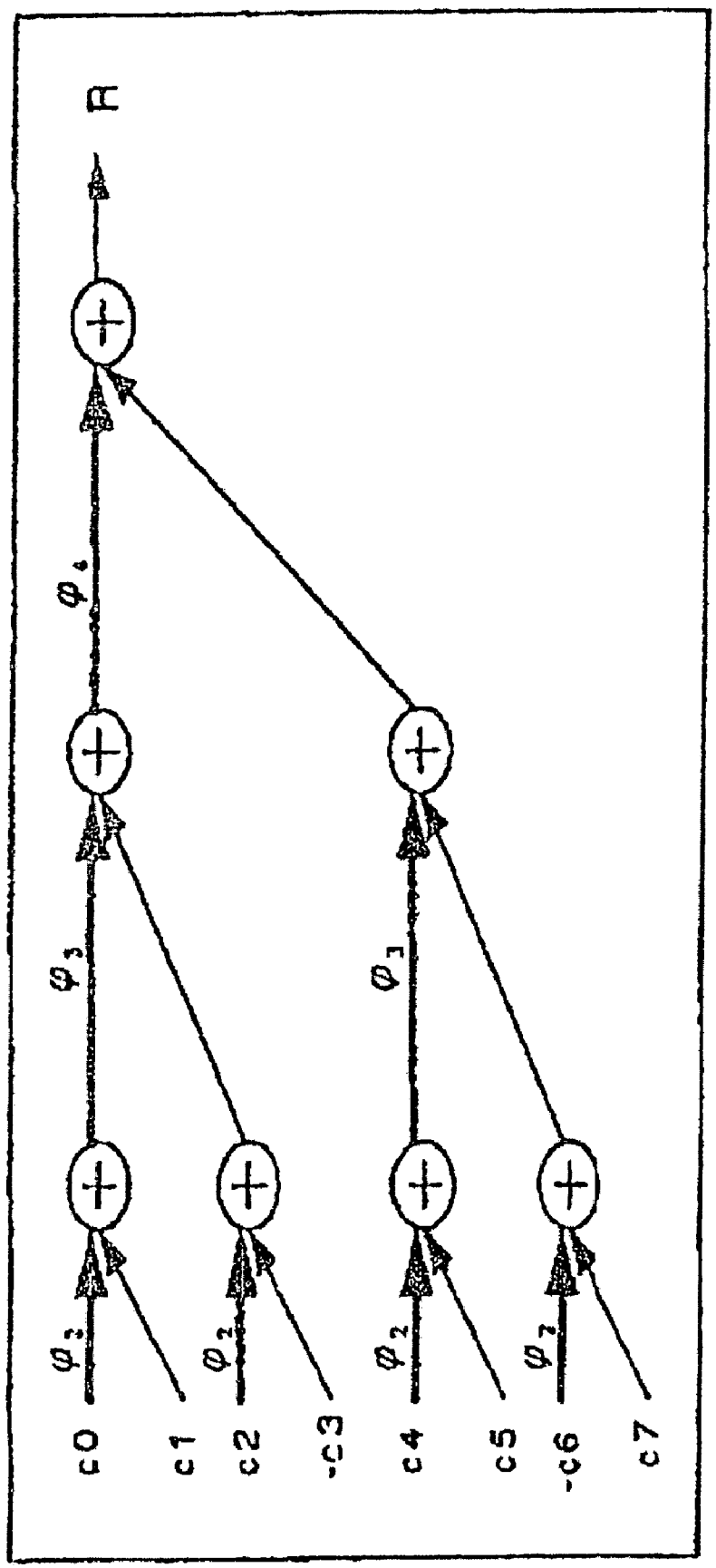
FIG. 1 shows a single vector CCK correlator of the prior art.
Figure 2:
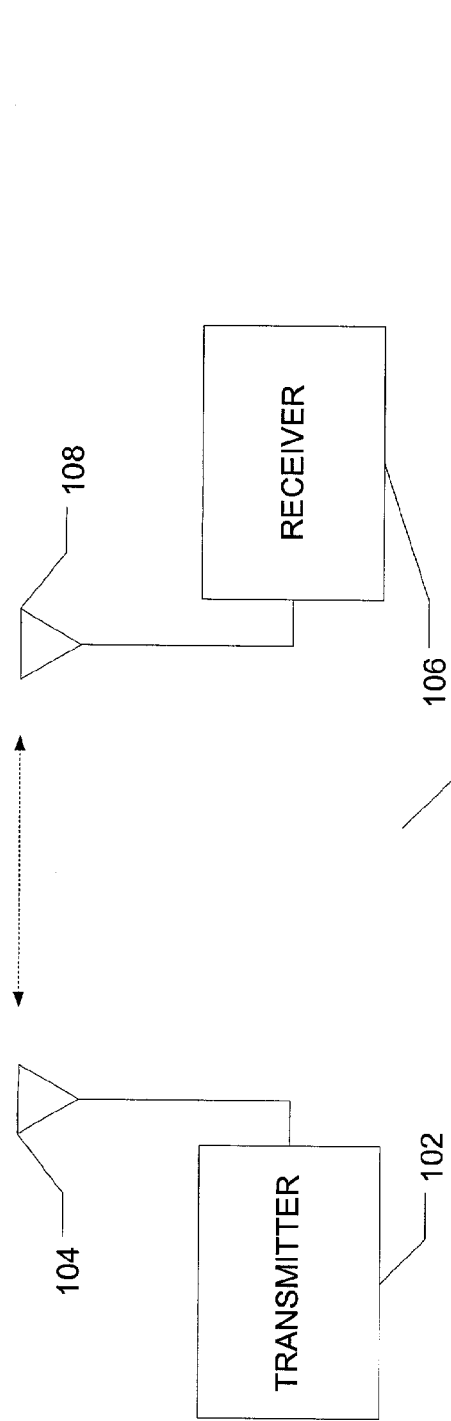
FIG. 2 shows one exemplary operating environment of the present invention.

An exemplary operating environment for the illustrated system of the present invention is depicted in FIG. 2. Specifically, FIG. 2 depicts a wireless local area network 100 according to the present invention. A transmitter 102, an antenna 104, a receiver 106 and an antenna 108 are depicted. The transmitter 102 provides the data that is to be transmitted across antenna 104 to the receiver 106. The receiver 106 receives the transmitted data via antenna 108.

Figure 3:
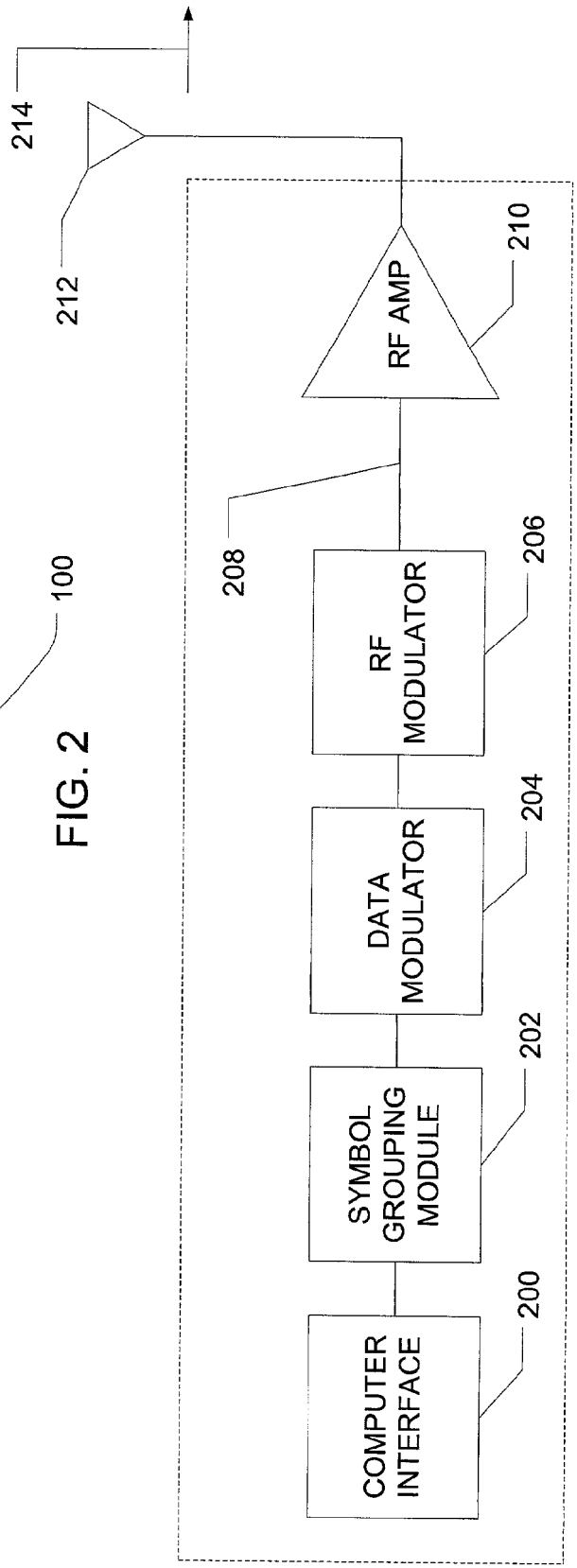
FIG. 3 shows one exemplary embodiment of a data transmitter used in accordance with the present invention.

FIG. 3 depicts the transmitter 102 (FIG. 2) according to one embodiment of the present invention. Referring to FIG. 3, a computer interface 200, a symbol grouping module 202, a data modulator 204, a radio frequency modulator 206, a radio frequency signal 208, a radio frequency amplifier 210, and an antenna 212 are shown. The computer interface 200 provides a stream of binary data which represents information to be modulated and transmitted across the wireless local area network 100 (FIG. 2). The symbol grouping module 202 receives the stream of binary data from the computer interface 200 and divides the stream into a series of data words, with each data word representing a symbol value. The symbol values or data words from the grouping module 202 are then passed to the data modulator 204. The data modulator 204 modulates the data words into CCK modulated data that is compliant with the IEEE802.11b specifications. The CCK modulated data is then directed to the radio frequency (RF) modulator 206 which converts the CCK modulated data into a radio frequency signal. The radio frequency signal 208 is amplified by the radio frequency amplifier 210 such that it may be transmitted by antenna 212 as packets of data 214 (represented by an arrow in FIG. 3).

Figure 4:
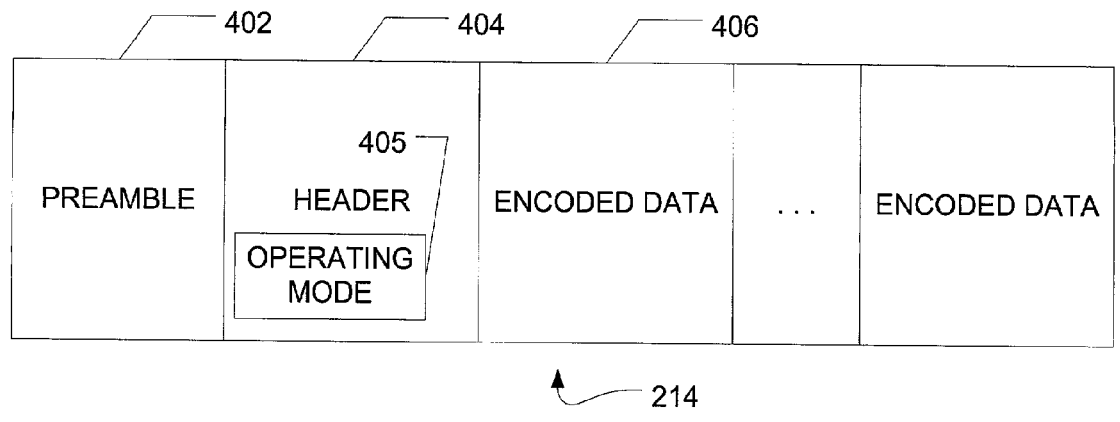
FIG. 4 shows one exemplary data structure used in accordance with the principles of the present invention.

Referring to FIG. 4, the packets of data 214 that are transmitted by the antenna 212 contain a preamble 402, a header 404, an operating mode indicator 405, and encoded data 406. The operating mode indicator 405, contained within the header 404, is an indication of whether the operating mode is DSSS 1 Mbps, DSSS 2 Mbps, CCK 5.5 Mbps or CCK 11 Mbps mode.

ENCODING DATA

Figure 5:
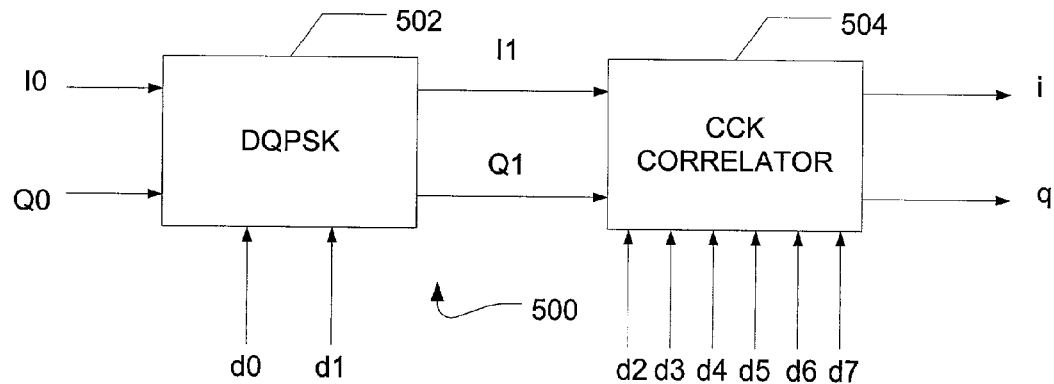
FIG. 5 shows an exemplary data encoding structure for use in accordance with the principles of the present invention.

Referring to FIG. 5, a CCK encoder 500 according to one exemplary embodiment of the present invention is depicted. The CCK encoder 500 includes a differential quadrature phase shift key (DQPSK) modulator 502 and a CCK correlator 504. The computer interface 200 (FIG. 3) outputs data bits d0–d3 (in 5.5 Mbps mode) or d0–d7 (in 11 Mbps mode). Regardless of whether the encoder 500 is operating in 5.5 Mbps mode or 11 Mbps mode, d0 and d1 are applied to the DQPSK modulator to encode the phase parameter $\psi_1$. DQPSK is well-known in the art. The phase parameter $\psi_1$ is determined based on the data bits d0 and d1 according to the table below:

| (d1, d0) | Phase (even symbols) | Phase (odd symbols) |
| --- | --- | --- |
| 00 | 0 | $\pi$ |
| 01 | $\pi/2$ | $-\pi/2$ |
| 10 | $-\pi/2$ | $\pi/2$ |
| 11 | $\pi$ | 0 |

Data bits d2–d3 (5.5 Mbps) or d2–d7 (11 Mbps) are applied to the CCK correlator 504. The CCK correlator 504 receives the appropriate data bits (d2–d3 or d2–d7) and encodes the phase parameters $\psi_2$, $\psi_3$ and $\psi_4$ according to equation (2) or equation (3), respectively.

An even/odd rotator (not shown) may be utilized in the encoder 500 to output a signal that toggles between two different states. For even symbols, no rotation is applied to the phase value. For odd symbols, an additional rotation of $\pi$ is applied to the phase value. By additionally encoding data with such a signal, effects of DC offset are reduced because any encoded symbol will have been encoded with a different odd/even status from the immediately preceding and following encoded symbols.

After the data bits have been applied to the CCK encoder 500, all of the phase parameters $\psi_1$, $\psi_2$, $\psi_3$ and $\psi_4$ will have been encoded. With all of the phase parameters thus being known, the phase parameter values may then be substituted into equation (1) to yield the eight-chip symbol. It should be noted that the symbol will contain eight complex chips, regardless of whether four data bits (5.5 Mbps) or eight data bits (11 Mbps) are used. The eight-chip symbol is then RF modulated by RF modulator 206, amplified by RF amplifier 210, and transmitted from antenna 212 (FIG. 3).

ENCODING EXAMPLE

As an example, if the CCK modulator 500 is operating in 5.5 Mbps mode and receives four data bits d3–d0 (MSB to LSB) {1, 0, 0, 1}, the output of the DQPSK modulator 502 will be π/2, and therefore $\psi_1$=π/2. $\psi_2$ is equal to (d2*2+1)*π/2 or (0*2+1)*π/2 which equals π/2 which equals π/2. $\psi_3$ is defined as 0 in 5.5 Mbps mode. Finally, $\psi_4$ is equal to d3*2*π/2 or π. Thus {$\psi_1$, $\psi_2$, $\psi_3$, $\psi_4$} equals {π/2, π/2, 0, π}. Substituting those values into equation (1) yields the symbol c={$e^{j2\pi}$, $e^{j\pi/2}$, $e^{j2\pi}$, $-e^{j3\pi/2}$, $e^{j\pi}$, $e^{j3\pi/2}$, $-e^{j\pi}$, $e^{j\pi/2}$}. Euler's formula is provided below in equation (4):

$$e^{j\theta} = \cos\theta + j\sin\theta \quad (4)$$

Substituting the complex chip values for c (shown above) into equation (4) yields the complex symbol c={1, −j, 1, j, −1, −j, 1, j}. Thus it is apparent that any symbol to be transmitted may be derived through the use of the above equations.

DECODING DATA

Figure 6:
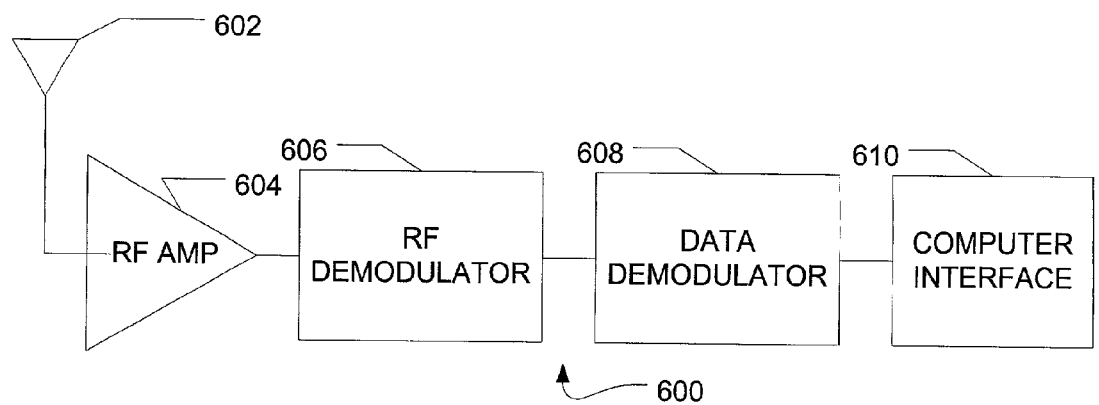
FIG. 6 shows one exemplary embodiment of a data receiver for use in accordance with the principles of the present invention.

FIG. 6 illustrates one exemplary embodiment of a receiver 600 (receiver 106 in FIG. 2) in accordance with the principles of the present invention. The receiver 600 includes an antenna 602, an RF amplifier 604, an RF demodulator 606, a data demodulator 608, and a computer interface 610. The encoded data packets transmitted by the antenna 212 (FIG. 3) are received by the antenna 602. The encoded data packets are applied to the RF amplifier 604 and the RF demodulator 606 to restore the data packets to a baseband signal. The data packets are then demodulated by the data demodulator 608 so that the original data from the computer interface 200 may be recovered.

Figure 7:
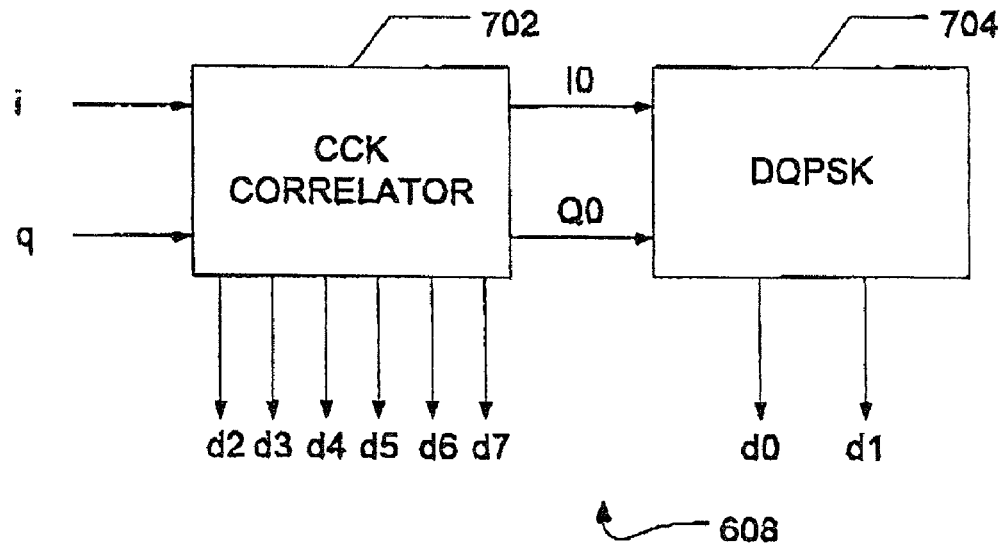
FIG. 7 shows data decoding structure for use in accordance with the principles of the present invention.

Referring to FIG. 7, one exemplary embodiment of the data demodulator 608 (FIG. 6) is shown in further detail. The data demodulator 608 includes a CCK 64-vector correlator 702 and a DQPSK demodulator 704. The CCK 64-vector correlation implemented by the illustrated CCK correlator 702 can be written as:

$$R = \begin{bmatrix} c0 \\ c1 \\ c2 \\ -c3 \\ c4 \\ c5 \\ -c6 \\ c7 \end{bmatrix}^T \begin{bmatrix} e^{j(\varphi_2+\varphi_3+\varphi_4)} \\ e^{j(\varphi_3+\varphi_4)} \\ e^{j(\varphi_2+\varphi_4)} \\ e^{j\varphi_2} \\ e^{j(\varphi_2+\varphi_3)} \\ e^{j\varphi_3} \\ e^{j\varphi_2} \\ 1 \end{bmatrix}^* = \begin{bmatrix} c0 \\ c2 \\ c1 \\ -c3 \\ c4 \\ -c6 \\ c5 \\ c7 \end{bmatrix}^T \begin{bmatrix} e^{j(\varphi_2+\varphi_3+\varphi_4)} \\ e^{j(\varphi_2+\varphi_4)} \\ e^{j(\varphi_3+\varphi_4)} \\ e^{j\varphi_4} \\ e^{j(\varphi_2+\varphi_3)} \\ e^{j\varphi_2} \\ e^{j\varphi_2} \\ 1 \end{bmatrix}^* \quad (5)$$

The correlator output R may be expanded as shown below:

$$R = \begin{bmatrix} c0 \\ c2 \\ c1 \\ -c3 \\ c4 \\ -c6 \\ c5 \\ c7 \end{bmatrix}^T \begin{bmatrix} e^{j\varphi_3} \\ 1 \\ e^{j\varphi_3} \\ 1 \\ e^{j\varphi_3} \\ 1 \\ e^{j\varphi_3} \\ 1 \end{bmatrix}^* \begin{bmatrix} e^{j\varphi_2} \\ 1 \\ e^{j\varphi_2} \\ 1 \end{bmatrix}^* \begin{bmatrix} e^{j\varphi_4} \\ 1 \end{bmatrix}^*$$

Figure 8:
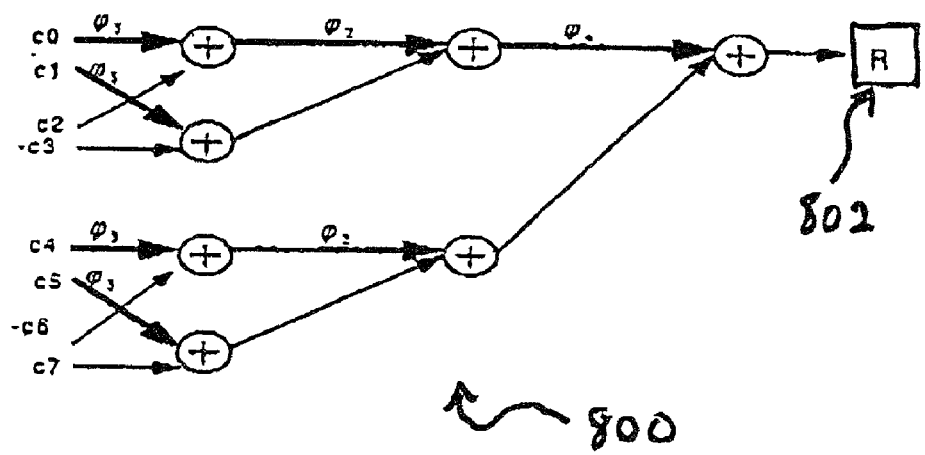
FIG. 8 shows a single-vector CCK correlator for use in accordance with one exemplary embodiment of the present invention.

A single-vector implementation of the CCK correlator described above is depicted in FIG. 8. It should be appreciated that because the correlator 800 depicted in FIG. 8 is a single-vector correlator, application of a particular combination of phase parameters $\psi_2$, $\psi_3$ and $\psi_4$ to the correlator 800 will yield a single output value R of the set of 64 possible correlator outputs values 802.

Figure 9:
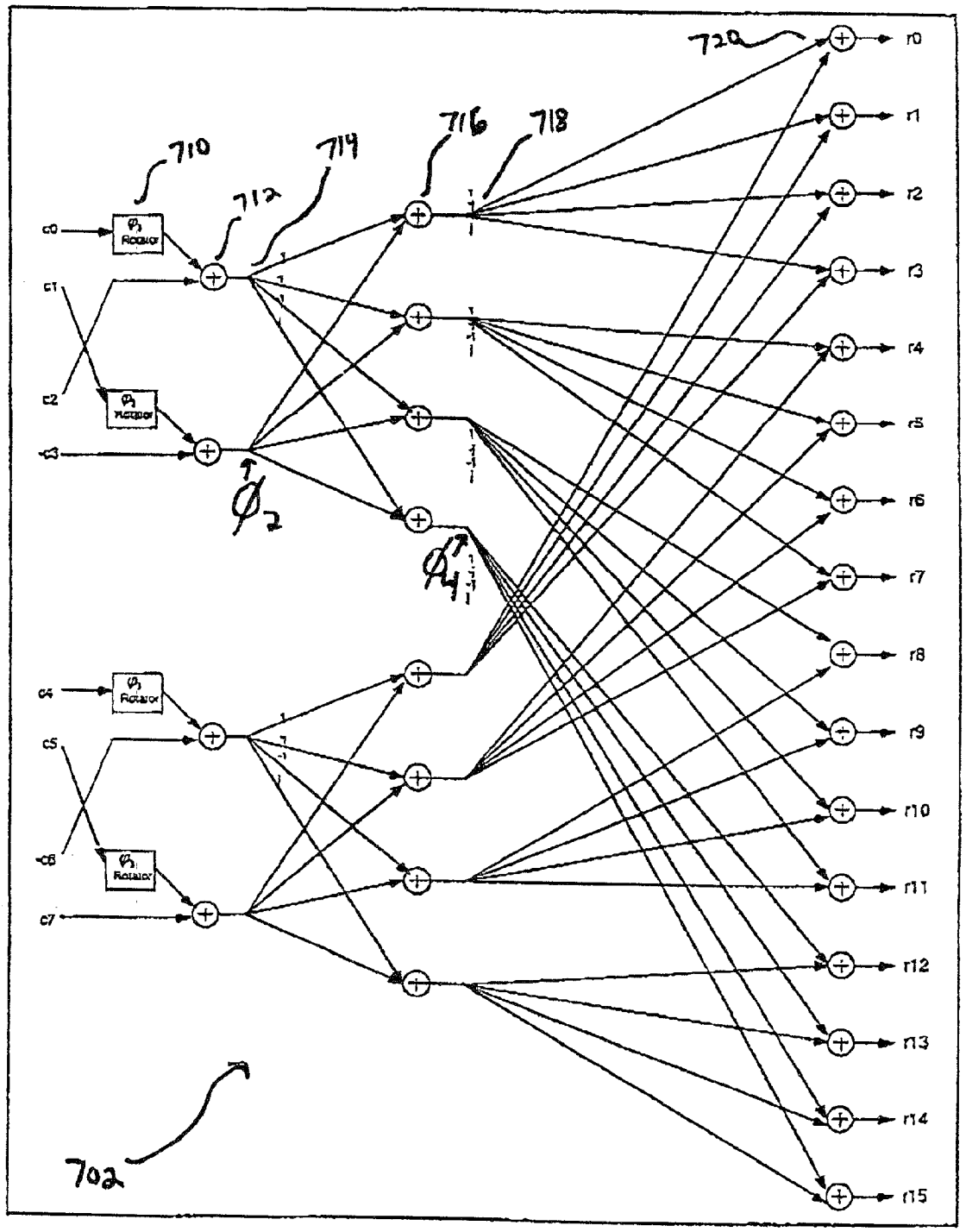
FIG. 9 shows a 64-vector CCK correlator for use in accordance with one exemplary embodiment of the present invention.

One exemplary embodiment of the 64-vector CCK correlator 702 according to the present invention is depicted in FIG. 9. The received symbol c, made up of chips c0–c7, is applied to the input of the correlator 702. It should be appreciated that, through the use of the four different vector values for each of the phase parameters $\psi_2$, $\psi_3$ and $\psi_4$, 64 different correlator output values are possible (4*4*4=64). $\psi_3$ Rotator 710 is provided to rotate or cycle through the four possible values that $\psi_3$ may assume. Of course, it should be appreciated that $\psi_3$ may only assume four possible values when operating in 11 Mbps mode; in 5.5 Mbps mode, $\psi_3$ is fixed at a value of 0. Two terms are summed at summers 712. For example, a $\psi_3$-rotated value of c0 (i.e., c0*e+j$\psi_3$) is summed with c2, a $\psi_3$-rotated value of c1 is summed with −c3, etc. At 714, the four possible vectors of $\psi_2$ (1, −j, −1, j) are applied to the output of the summers 712. Two terms corresponding to $\psi_2$ and $\psi_3$ that have been decomposed according to equation (5) are summed at summers 716. At 718, the four possible vector values of $\psi_4$ are applied to modify the outputs 718 of the summers 716. Finally, two terms corresponding to $\psi_2$, $\psi_3$ and $\psi_4$ that have been decomposed according to equation (5) are summed at summers 720. The output of the various summers 720 correspond to correlator outputs t0–r15 (i.e. outputs 722). Thus, for any given value of 104 $_3$, there will be sixteen possible correlator outputs 722 with an index [$\psi_2$, $\psi_4$].

When the correlator 702 is operating in 11 Mbps mode, four clock cycles will be required in order to generate the 64 possible outputs 722, i.e. 16 outputs 722 per clock cycle, with the $\psi_3$ Rotators 710 rotating once per clock cycle. When the correlator 702 is operating in the 5.5 Mbps mode, however, only one clock cycle will be required to generate all available outputs 722. This is because, in the 5.5 Mbps mode, $\psi_3$ may only assume the value 0, such that there is no need to rotate through other possible vector values. As a consequence of the correlator design of the present invention, the amount of power required for demodulating while operating at 5.5 Mbps is greatly reduced compared to the prior art correlators as described above. Further, the correlator of the present invention is appreciably faster, because there is no need to rotate through the other possible $\psi_3$ values.

The correlator outputs 722 are analyzed to determine which of the outputs r0–r15 is of the greatest magnitude.

Figure 10:
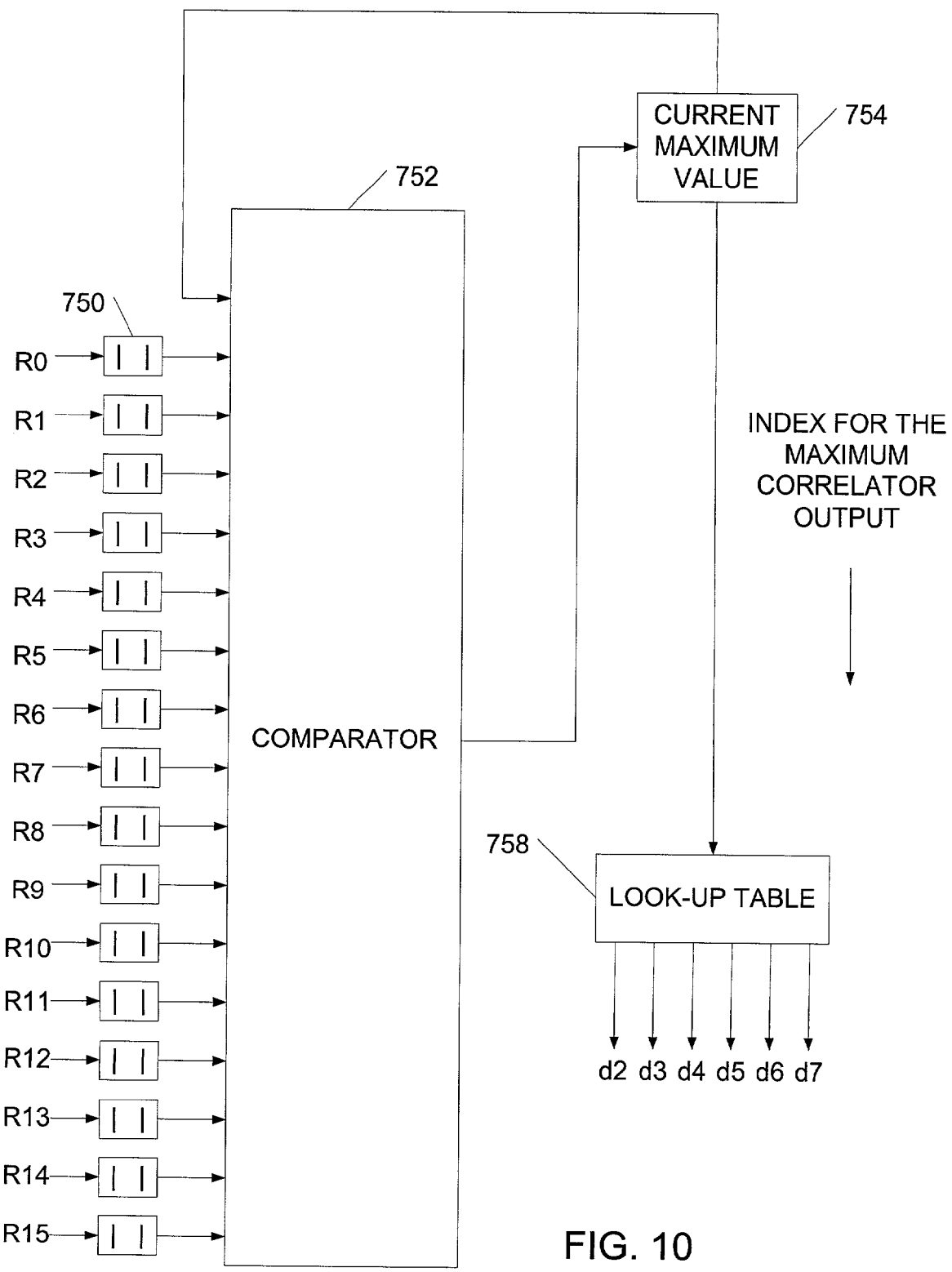
FIG. 10 shows a structure for use in demodulating to recover at least some original data bits according to one exemplary embodiment of the present invention.

Referring to FIG. 10, each of the correlator outputs 722 is applied to an absolute value module 750. The absolute value module 750 will output a value representative of the magnitude of the inputted correlator output r0–r15, respectively. The maximum value is held in a current maximum value module 754. The value in the current maximum value module 754 is preferably initialized to 0 such that the actual maximum correlator output 722 for the first iteration of phase rotations will be stored. The output of each absolute value module 750 and the current maximum value held in the current maximum value module 754 are compared. Thus, in one exemplary embodiment, 17 comparisons are performed (one for each of the sixteen correlator outputs and one for the previous maximum value) for each of the four phase rotations of the $\psi_3$ rotator. If the correlator 702 is operating in 5.5 Mbps mode, then all of the possible correlator values will have been generated, and the maximum value of those output values will be known and stored in the current maximum value module 754. If the correlator 702 is operating in 11 Mbps mode, then $\psi_3$ will be rotated three times, spanning all four phase values, and the correlator 702 will generate 16 correlator output values with each rotation. Comparisons are performed for each of the rotations and the maximum value of those 64 correlator values will be stored in the current maximum value module 754. It should be appreciated by those skilled in the art that there are numerous other methods of determining the maximum value of a set of output values.

After determining the value of the maximum correlator output 722, the index of the CCK correlator 702 with a maximum value is mapped to the corresponding data values. Specifically, the original data values d2–d7 (11 Mbps) or d2–3 (5.5 Mbps) are determined through the use of an encoder, e.g. look-up table 758. Look-up table 758 outputs data bits that correspond to the correlator index that has the maximum correlator output value.

The maximum correlator output value is also used to determine data values d0–d1. This is done through DQPSK demodulation performed by DQPSK demodulation module 704 (FIG. 7).

The original data values d0–d3 (5.5 Mbps) or d0–d7 (11 Mbps) are then provided by the data demodulator 608 to the computer interface 610 (FIG. 6).

Figure 11:
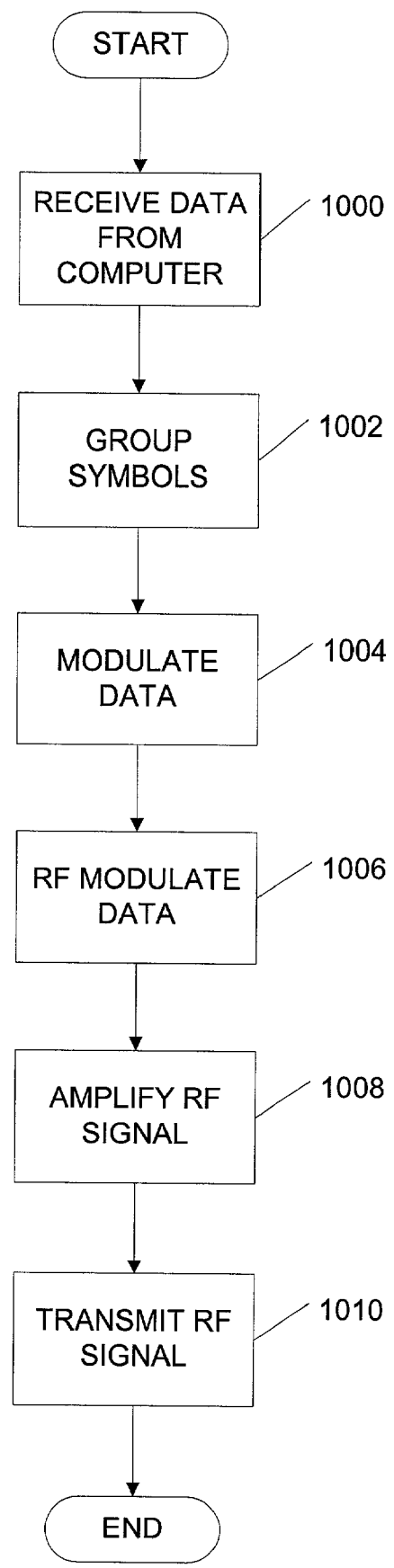
FIG. 11 shows a flow diagram depicting an exemplary transmission portion of one exemplary embodiment of the present invention.

FIG. 11 is a flow diagram depicting the transmission portion according to one embodiment of the present invention. In block 1000, data is received from a computer via the computer interface 200 (FIG. 3). The data is then grouped into symbols in block 1002 by the symbol grouping module 202 (FIG. 3). In block 1004, the data is modulated by the data modulator 204 (FIG. 3). The baseband modulated data is then RF modulated in block 1006 by the RF modulator 206 (FIG. 3). In block 1008, the RF signal is amplified by RF amplifier 210 (FIG. 3). Finally, the amplified RF signal is transmitted in block 1010 by antenna 212 (FIG. 3).

Figure 12:
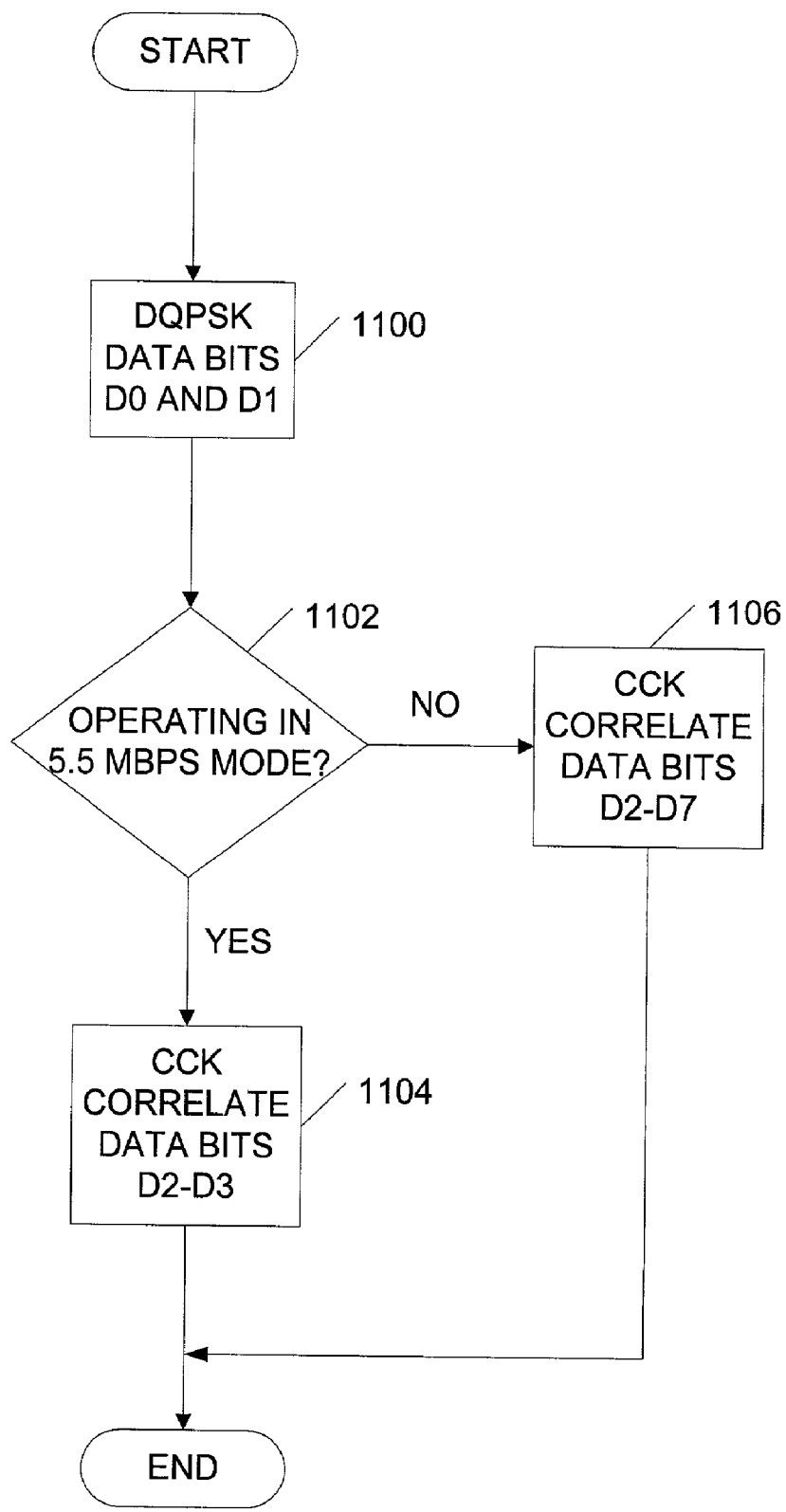
FIG. 12 shows a flow diagram depicting an exemplary encoding of data bits according to one exemplary embodiment of the present invention.

FIG. 12 is a flow diagram depicting the encoding or data modulation portion according to one exemplary embodiment of the present invention. In block 1100, data bits d0 and d1 are DQPSK encoded by the DQPSK encoder 500 (FIG. 5). A determination is then made as to whether the CCK encoder 500 is operating in 5.5 Mbps or 11 Mbps mode (block 1102). An indication of the operating mode is stored in the header 404 (FIG. 4). If the CCK encoder 500 is operating in 5.5 Mbps mode, then, in block 1104, data bits d2–d3 are applied to the CCK correlator 504 (FIG. 5). It should be recognized that four bits are used in 5.5 Mbps encoding. If the CCK encoder 500 is operating n 11 Mbps mode, then, in block 1106, data bits d2–d7 are applied to the CCK correlator 504 (FIG. 5).

Figure 13:
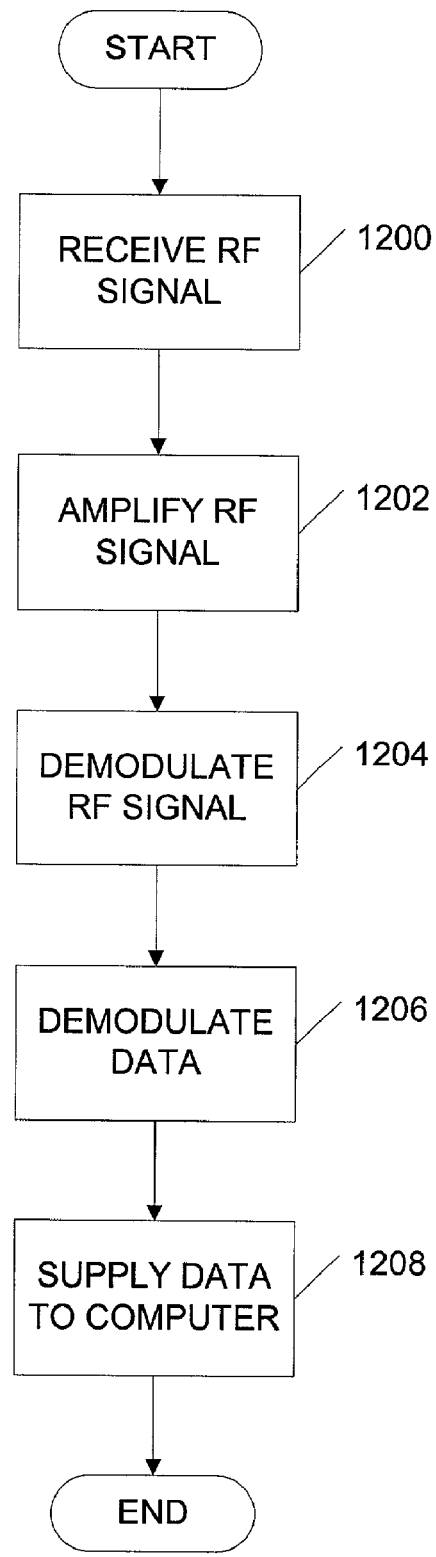
FIG. 13 shows a flow diagram depicting an exemplary receiving portion of one exemplary embodiment of the present invention.

FIG. 13 is a flow diagram depicting the received portion according to one embodiment of the present invention. At block 1200, the RF signal transmitted by antenna 212 (FIG. 3) is received by antenna 602 (FIG. 6). The RF signal is then amplified at block 1202 by RF amplifier 604 (FIG. 6). In block 1204, the amplified RF signal is demodulated by the RF demodulator 606 (FIG. 6). The demodulated RF signal is then in block 1206 demodulated by the data demodulator 608 (FIG. 6). In block 1208, the demodulated data is then supplied to a receiver computer (not shown) via computer interface 610 (FIG. 6).

Figure 14:
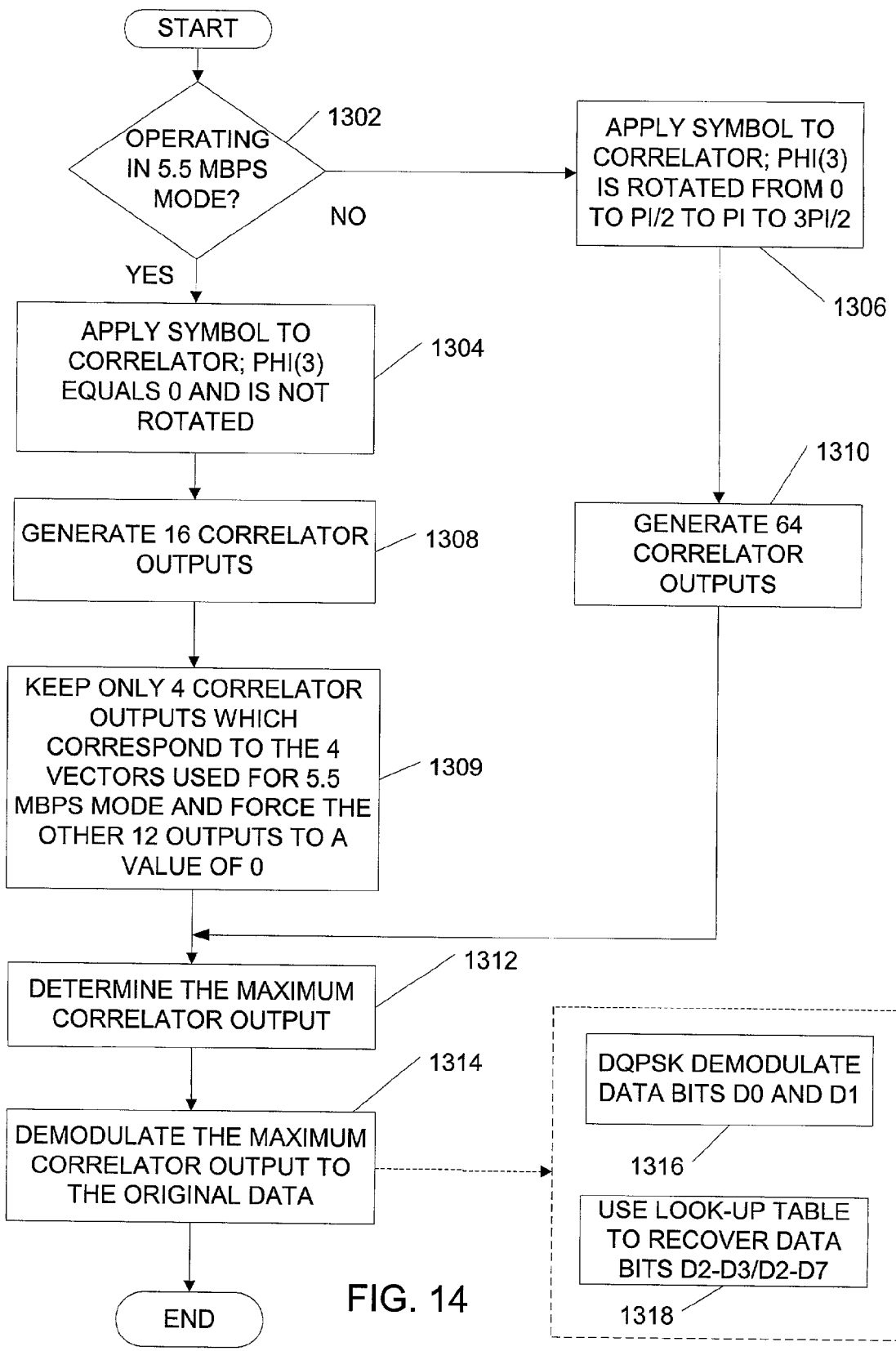
FIG. 14 shows a flow diagram depicting one exemplary approach to decoding data bits according to the principles of the present invention.

FIG. 14 is a flow diagram depicting data demodulation according to one exemplary embodiment of the present invention. In block 1302, it is determined if the data demodulator 608 (FIGS. 6–7) is operating in 5.5 Mbps or 11 Mbps mode. This is done by examining the header 404 (FIG. 4) which contains an indication of the operating mode in the operating mode indicator 405. If the data demodulator 608 is operating in 5.5 Mbps mode, then at block 1304 the received symbol is applied to the correlator 702 (FIG. 7). The $\psi_3$ rotator is set to output a value of 0, as $\psi_3$ is not rotated in 5.5 Mbps mode according to one exemplary embodiment of the present invention. The correlator 702 then generates 16 outputs (block 1308). The correlator 702 keeps only four of the outputs which correspond to the four vectors used for the 5.5 Mbps mode. The other twelve output values are forced to a value of 0 (block 1309). If, on the other hand, the data demodulator 608 is operating in 11 Mbps mode, then at block 1306 the received symbol is applied to the correlator 702 (FIG. 7). The $\psi_3$ rotator, however, is now set to rotate through its four values (0, $\pi/2$, $\pi$ and $3\pi/2$), so that the correlator 702 will generate 64 outputs (block 1310). Regardless of whether 16 or 64 outputs are generated (i.e., in either operating mode), at block 1312 the maximum correlator output is determined. The maximum correlator output is then demodulated to output the original data (block 1314). As shown, the demodulation of the block 1314 is performed by DQPSK demodulating the data to determine data bits d0 and d1 (block 1316) and using a look-up table to recover data bits d2–d3 (5.5 Mbps) or d2–d7 (11 Mbps) (block 1318).

It should also be appreciated by those skilled in the art that the present invention may be practiced through the use of a general purpose processor, best embodied by software.

While the present invention has been described with respect to what is presently considered to be the preferred embodiment, i.e. a method and apparatus for complementary code keying, it is to be understood that the invention is not limited to the disclosed embodiment. To the contrary, the invention is intended to cover various modifications and equivalent arrangements included within the spirit and scope of the appended claims. For example, it is to be understood that the invention is applicable to other correlator architectures in which phase rotators may selectively be used. The scope of the following claims is to be accorded the broadest interpretation so as to encompass all such modifications and equivalent structures and functions.

What is claimed is:

1. A method of decoding data that has been Complementary Code Keying (CCK)-encoded at one of first and second differing data rates comprising:
    receiving a symbol;
    determining which of the first and second data rates was used to encode the symbol;

applying the symbol to a first correlator to generate a set of correlator output signals, wherein the first correlator generates the set of correlator output signals based on a first mode when the first data rate was used to encode the symbol and based on a second mode when the second data rate was used to encode the symbol;

identifying a maximum-valued signal in one of the set of correlator output signals; and demodulating the maximum-valued signal in one of the set of correlator output signals.

2. The method of claim 1, wherein the symbol comprises eight complex chips.

3. The method of claim 1, further comprising rotating a phase of the symbol to generate the set of correlator output signals if the higher of the first and second data rates was used to encode the symbol.

4. The method of claim 3, further comprising rotating the phase of the symbol to each of a predetermined number of phases.

5. The method of claim 4, wherein the predetermined number of phases is four.

6. The method of claim 1, wherein the set of correlator output signals includes a number of signals dependent upon which of the first and second data rates was used to encode the symbol.

7. The method of claim 1, wherein demodulating the maximum-valued signal in one of the set of correlator output signals includes applying the maximum-valued one of the correlator output signals to a look-up table.

8. The method of claim 1, wherein demodulating the maximum-valued signal in one of the set of correlator output signals includes applying the maximum-valued one of the correlator output signals to a differential Quadrature Phase Shift Key (QPSK)demodulator.

9. The method of claim 1, wherein the encoded data includes an indication of a data rate used to encode the symbol, and wherein determining which of the first and second data rates was used to encode the symbol comprises extracting the indication from the encoded data.

10. An apparatus for decoding data that has been Complementary Code Keying (CCK)-encoded at one of first and second differing rates comprising:

means for receiving a symbol;

means for determining which of the first and second data rates was used to encode the symbol;

means for applying the symbol to a correlator means to generate a set of correlator output signals, wherein the correlator means generates the correlator output signals based on a first mode when the first data rate was used to encode the symbol and based on a second mode when the second data rate was used to encode the symbol;

means for identifying a maximum-valued signal in one of the set of correlator output signals; and means for demodulating the maximum-valued signal in one of the set of correlator output signals.

11. The apparatus of claim 10, wherein the symbol comprises eight complex chips.

12. The apparatus of claim 10, further comprising a phase rotating means to generate the set of correlator output signals if the higher of the first and second data rates was used to encode the symbol.

13. The apparatus of claim 12, wherein said phase rotating means includes means for rotating the phase of the symbol to each of a predetermined number of phases.

14. The apparatus of claim 13, wherein the predetermined number of phases is four.

15. The apparatus of claim 10, wherein the set of correlator output signals includes a number of signals dependent upon which of the first and second data rates was used to encode the symbol.

16. The apparatus of claim 10, wherein the means for demodulating the maximum valued signal in one of the set of correlator output signals includes means for applying the maximum valued one of the correlator output signals to a look-up table means.

17. The apparatus of claim 10, wherein the means for demodulating the maximum valued one of the correlator output signals includes means for applying the maximum valued one of the correlator output signals to a differential Quadrature Phase Shift Key (QPSK) demodulating means.

18. The apparatus of claim 10, wherein the encoded data includes an indication of a data rate used to encode the symbol, and wherein the means for determining which of the first and second data rates was used to encode the symbol comprises means for extracting the indication from the encoded data.

19. An apparatus for decoding data that has been Complementary Code Keying (CCK)-encoded at one of first and second differing rates comprising:

a CCK correlator; and a differential Quadrature Phase Shift Key (QPSK demodulator, wherein the CCK correlator includes a phase rotator that is used if the data has been encoded at the higher of the first and second differing rates and that is not used if the data has been encoded at the lower of the first and second differing rates.

20. An apparatus for decoding data that has been Complementary Code Keying (CCK)-encoded at one of first and second differing rates comprising:

a CCK correlator; and a differential Quadrature Phase Shift Key (QPSK demodulator, wherein the CCK correlator includes a phase rotator that is used if the data has been encoded at the higher of the first and second differing rates, a plurality of absolute value structures, and a comparator, wherein the outputs of the plurality of absolute value structures are applied to a plurality of inputs of the comparator, and wherein the output of the comparator is a maximum-valued signal in one of the plurality of inputs of the comparator.

21. The apparatus of claim 20, wherein the CCK correlator further comprises a maximum-value retaining structure, the output of the maximum-value retaining structure being applied to an input of the comparator.

22. The apparatus of claim 20, wherein the CCK correlator further comprises a lookup table, wherein the maximum-valued output of the comparator is applied to the look-up table.

23. A computer-readable media having stored thereon:

a first set of machine-executable instructions for controlling the receipt of a symbol;

a second set of machine-executable instructions controlling the determination of which of a first and second data rates was used to encode the symbol;

a third set of machine-executable instructions controlling the generation of a set of correlator output signals, wherein the third set generates the set of correlator output signals based on a first mode when the first data rate was used to encode the symbol and based on a second mode when the second data rate was used to encode the symbol;

a fourth set of machine-executable instructions controlling the identification of a maximum-valued signal in one of the set of correlator output signals; and a fifth set of machine-executable instructions controlling the demodulation of the maximum-valued signal in one of the set of correlator output signals.

24. The computer-readable media of claim 23, wherein the symbol comprises eight complex chips.

25. The computer-readable media of claim 23, further comprising a sixth set of machine-executable instructions controlling the rotation of at least one of a plurality of phases of the symbol if the higher of the first and second data rates was used to encode the symbol.

26. The computer-readable media of claim 25 further comprising, a seventh set of machine-executable instructions controlling phase rotation of the symbol to each of a predetermined number of phases.

27. The computer-readable media of claim 26, wherein the predetermined number of phases is four.

28. The computer-readable media of claim 23, wherein the set of correlator output signals includes a number of signals dependent upon which of the first and second data rates was used to encode the symbol.

29. The computer-readable media of claim 26, wherein the fifth set of machine executable instructions for controlling the demodulation of the maximum-valued signal in one of the set of correlator output signals further comprises an eighth set of machine-executable instructions for controlling the application of the maximum-valued signal in one of the set of correlator output signals to a look-up table.

30. The computer-readable media of claim 29, wherein the look-up table comprises a ninth set of machine-executable instructions controlling the application of a look-up function to the maximum-valued signal in one of the set of correlator output signals.

31. The computer-readable media of claim 30, wherein the fifth set of machine executable instructions for controlling the demodulation of the maximum-valued signal in one of the set of correlator output signals further comprises a tenth set of machine-executable instructions for controlling the application of the maximum-valued signal in one of the set of correlator output signals to a differential Quadrature Phase Shift Key (QPSK) demodulator means.

32. The computer-readable media of claim 31, wherein the differential QPSK demodulator means comprises an eleventh set of machine-executable instructions controlling differential QPSK demodulating the maximum-valued one of the correlator output signals.

33. A method of Complementary Code Keying (CCK)-encoding and decoding data comprising:

generating an encoded symbol at one of a first and second data rates;

storing an indication of at which of the first and second data rates the encoded symbol was generated;

transmitting the encoded symbol; receiving the encoded symbol;

determining which of the first and second data rates was used to encode the symbol;

applying the symbol to a first correlator to generate a set of correlator output signals, wherein the first correlator generates the set of correlator output signals based on a first mode when the first data rate was used to encode the symbol and based on a second mode when the second data rate was used to encode the symbol;

identifying a maximum-valued signal in one of the set of correlator output signals; and demodulating the maximum-valued signal in one of the set of correlator output signals.

34. The method of claim 33 wherein generating an encoded symbol comprises applying a symbol to a differential Quadrature Phase Shift Key (QPSK modulator.

35. The method of claim 33 wherein generating an encoded symbol comprises applying a symbol to a CCK correlator.

36. The method of claim 33 wherein transmitting the encoded symbol further comprises converting the encoded symbol to a radio-frequency signal.

37. The method of claim 33 wherein receiving the encoded symbol further comprises converting a radio-frequency signal to a baseband signal.

38. The method of claim 33 wherein the encoded symbol comprises eight complex chips.

39. The method of claim 33 further comprising rotating a phase of the symbol to generate the set of correlator output signals if the higher of the first and second data rates was used to encode the symbol.

40. The method of claim 39 wherein the rotating includes rotating the phase of the symbol to each of a predetermined number of phases.

41. The method of claim 40 wherein the predetermined number of phases is four.

42. The method of claim 33 wherein the set of correlator output signals includes a number of signals dependent upon which of the first and second data rates was used to encode the symbol.

43. The method of claim 33 wherein demodulating the maximum-valued signal in one of the set of correlator output signals includes applying the maximum-valued one of the correlator output signals to a look-up table.

44. The method of claim 33 wherein demodulating the maximum-valued signal in one of the set of correlator output signals includes applying the maximum-valued one of the correlator output signals to a differential QPSK demodulator.

45. The method of claim 33 wherein determining which of the first and second data rates was used to encode the encoded symbol comprises extracting the indication from the encoded data.

46. An apparatus for Complementary Code Keying (CCK)-encoding and decoding data comprising:

means for generating an encoded symbol at one of a first and second data rates; means for storing an indication of at which of the first and second data rates the encoded symbol was generated;

means for transmitting the encoded symbol; means for receiving the encoded symbol;

means for determining which of the first and second data rates was used to encode the symbol;

means for applying the symbol to a correlator means to generate a set of correlator output signals, wherein the correlator means generates the correlator output signals based on a first mode when the first data rate was used to encode the symbol and based on a second mode when the second data rate was used to encode the symbol;

means for identifying a maximum-valued signal in one of the set of correlator output signals; and means for demodulating the maximum-valued signal in one of the set of correlator output signals.

47. The apparatus of claim 46 wherein the means for generating an encoded symbol comprises a differential Quadrature Phase Shift Key (QPSK modulator.

48. The apparatus of claim 46 wherein the means for generating an encoded symbol comprises a CCK correlator.

49. The apparatus of claim 46 wherein the means for transmitting the encoded symbol further comprises means for converting the encoded symbol to a radio-frequency signal.

50. The apparatus of claim 49 wherein the means for convening the encoded symbol to a radio-frequency signal comprises a radio-frequency modulator.

51. The apparatus of claim 46 wherein the means for receiving the encoded symbol further comprises means for converting a radio-frequency signal to a baseband signal.

52. The apparatus of claim 51 wherein the means for converting a radio-frequency signal to a baseband signal comprises a radio-frequency demodulator.

53. The apparatus of claim 46 wherein the encoded symbol comprises eight complex chips.

54. The apparatus of claim 46 further comprising means for rotating a phase of the encoded symbol to generate the set of correlator output signals if the higher of the first and second data rates was used to encode the symbol.

55. The apparatus of claim 54 wherein said means for rotating comprises means for rotating the phase of the encoded to each of a predetermined number of phases.

56. The apparatus of claim 55 wherein the predetermined number of phases if four.

57. The apparatus of claim 46 wherein the set of correlator output signals includes a number of signals dependent upon which of the first and second data rates was used to encode the symbol.

58. The apparatus of claim 46 wherein the means for demodulating the maximum valued signal in one of the correlator output signals includes means for applying the maximum valued signal in one of the correlator output signals a look-up table.

59. The apparatus of claim 46 wherein the means for demodulating the maximum valued signal in one of the set of correlator output signals includes means for applying the maximum valued signal in one of the set of correlator output signals to a differential QPSK demodulator.

60. The apparatus of claim 46 wherein the means for determining which of the first and second data rates was used to encode the encoded symbol comprises means for extracting the indication from the encoded data.

61. An apparatus for Complementary Code Keying (CCK)-encoding and decoding data at one of first and second differing rates comprising:
a differential Quadrature Phase Shift Key (QPSK modulator; a first CCK correlator;
a second CCK correlator; and
a differential QPSK demodulator,
wherein the first CCK correlator receives data to be encoded, the second CCK correlator receives data to be decoded, and wherein the second CCK correlator includes a phase rotator that is used if the data has been encoded at the higher of the first and second differing rates and is not used if the data has been encoded at the lower of the first and second differing rates.

62. The apparatus of claim 61 wherein the differential QPSK modulator communicates with a radio-frequency modulator coupled to a first antenna, and a second antenna coupled to a radio-frequency demodulator, wherein the radio-frequency modulator modulates a first baseband signal to a radio frequency signal, wherein the radio-frequency signal is transmitted by the first antenna, wherein the radio-frequency signal is received by the second antenna, and wherein the radio-frequency signal is converted to a second baseband signal by the radio-frequency demodulator.

63. The apparatus of claim 62, wherein the first and second baseband signals are equal.

64. An apparatus for Complementary Code Keying (CCK)-encoding and decoding data at one of first and second differing rates comprising:
a differential Quadrature Phase Shift Key (QPSK modulator; a first CCK correlator;
a second CCK correlator; and
a differential QPSK demodulator; wherein:
the second CCK correlator further comprises a plurality of absolute value structures and a comparator, wherein the outputs of the plurality of absolute value structures are applied to a plurality of inputs of the comparator, and wherein the output of the comparator is a maximum-valued signal in one of the plurality of inputs of the comparator; and
the first CCK correlator receives data to be encoded, the second CCK correlator receives data to be decoded, and the second CCK correlator includes a phase rotator that is used if the data has been encoded at the higher of the first and second differing rates.

65. An apparatus for CCK-encoding and decoding data at one of first and second differing rates comprising:
a differential QPSK modulator; a first CCK correlator;
a second CCK correlator; and
a differential QPSK demodulator, wherein:
the second CCK correlator further comprises a maximum-value retaining structure, the output of the maximum value retaining structure being applied to an input of a comparator; and
the first CCK correlator receives data to be encoded, the second CCK correlator receives data to be decoded, and the second CCK correlator includes a phase rotator that is used if the data has been encoded at the higher of the first and second differing rates.

* * * * *

UNITED STATES PATENT AND TRADEMARK OFFICE
CERTIFICATE OF CORRECTION

PATENT NO. : 7,145,969 B1
APPLICATION NO. : 10/092971
DATED : December 5, 2006
INVENTOR(S) : Guorong Hu et al.

It is certified that error appears in the above-identified patent and that said Letters Patent is hereby corrected as shown below:

| | |
|---|---|
| Column 6, Line 35 | Delete "+" and insert --^-- |
| Column 6, Line 47 | Delete "t0" and insert --r0-- |
| Column 6, Line 48 | Delete "104" and insert --Ψ-- |
| Column 7, Line 67 | Delete "n" and insert --in-- |
| Column 8, Line 3 | Delete "received" and insert --receiving-- |
| Column 9, Line 29 | Insert --set of-- after "one of the" (second occurrence) |
| Column 10, Line 7 | Insert --signal in-- after "applying the" |
| Column 10, Line 8 | Insert --set of-- after "one of the" |
| Column 10, Line 25 | Insert the closed --)-- after "(QPSK" |
| Column 10, Line 36 | Insert the closed --)-- after "(QPSK" |
| Column 10, Line 45 | Delete "maximum-valued" before "signal" |
| Column 11, Line 16 | Delete "phase rotation" after "controlling" |
| Column 11. Line 26 | Delete "maximum-valued" before "signal" |
| Column 12, Line 5 | Insert the closed --)-- after "(QPSK" |
| Column 12, Line 67 | Insert the closed --)-- after "(QPSK" |
| Column 13, Line 8 | Delete "convening" and insert --converting-- |
| Column 13. Line 24 | Insert --symbol-- after "encoded" |
| Column 13, Line 35 | Insert --to-- after "signals" |
| Column 13, Line 48 | Insert the closed --)-- after "(QPSK" |
| Column 13, Line 51 | Insert --Quadrature Phase Shift Key-- after "differential" and insert parenthesis around "QPSK" before "demodulator" |
| Column 14, Line 21 | Insert the closed --)-- after "(QPSK" |
| Column 14, Line 24 | Insert --Quadrature Phase Shift Key-- after "differential" and insert parenthesis around "QPSK" before "demodulator" |
| Column 14, Line 30 | Delete "maximum-valued" |
| Column 14, Line 40 | Insert --Quadrature Phase Shift Key-- after "differential" and insert parenthesis around "QPSK" before "demodulator |

UNITED STATES PATENT AND TRADEMARK OFFICE
CERTIFICATE OF CORRECTION

PATENT NO. : 7,145,969 B1
APPLICATION NO. : 10/092971
DATED : December 5, 2006
INVENTOR(S) : Guorong Hu et al.

It is certified that error appears in the above-identified patent and that said Letters Patent is hereby corrected as shown below:

Column 14, Line 42    Insert --Quadrature Phase Shift Key-- after "differential" and insert parenthesis around "QPSK" before "demodulator"

Signed and Sealed this

Twenty-second Day of May, 2007

JON W. DUDAS
*Director of the United States Patent and Trademark Office*